March 5, 1968 W. J. KIENE 3,371,537

PRESSURE INDICATOR

Filed Sept. 16, 1965

INVENTOR.
WILLIAM J. KIENE
BY R. E. Meech
ATTORNEYS.

United States Patent Office 3,371,537
Patented Mar. 5, 1968

3,371,537
PRESSURE INDICATOR
William J. Kiene, 6455 SW. 122nd St.,
Miami, Fla. 33156
Filed Sept. 16, 1965, Ser. No. 487,686
6 Claims. (Cl. 73—395)

ABSTRACT OF THE DISCLOSURE

A maximum pressure indicator for internal combustion engines, etc. having a check valve for holding the maximum pressure applied. A filter is positioned in the passageway between the test engine and the gauge.

Figure 1:
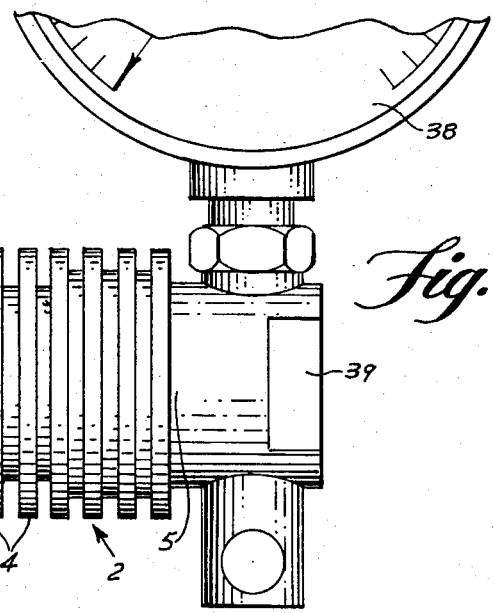

This invention relates to a pressure indicator and, more particularly, to an improved pressure indicator for determining the maximum pressure in the cylinders of internal combustion engines and the like.

Various types of indicators and gages have been suggested and used for determining the maximum pressure in the cylinders of internal combustion engines, air compressors, liquid pumps, etc. The maximum pressure indicators commonly used employ pistons and springs and consequently are easily affected by dirt and gummy oil. They require careful handling and must not be allowed to overheat if they are to be at all accurate. They can only be operated continuously for short periods of time. A gage in combination with an ordinary check valve has been heretofore used but such a valve was not entirely satisfactory in that the pressure in the cylinder to be tested would have to be greater than the pressure tending to keep the valve closed or seated before the indicator would determine the pressure therein. That is to say, the pressure in the cylinder would have to overcome the force of the spring tending to keep the valve closed and the cohesion between the valve and its seat before it would be registered on the gage. Also, oil, liquid fuel and other foreign elements tend to adhere to a valve having such a large seating area, and the collection of such thereon and therearound tended to make the valve stick and would not permit it to operate freely, at times preventing the valve entirely from operating, which, of course, made such indicators inefficient and very unsatisfactory.

According to the present invention, there is provided a maximum pressure indicator having an improved type valve therein which will not stick and which has no spring associated therewith, and, at the same time, a pressure indicator in which all the above disadvantages will be eliminated.

It is one of the objects of the present invention to provide an improved pressure indicator for determining the pressure in the cylinders of internal combustion engines and the like which will function properly at all times to accurately and efficiently indicate the maximum pressure therein.

It is another object of this invention to provide a pressure indicator for determining the maximum pressure in cylinders of internal combustion engines and the like which is simple and inexpensive in its construction and, at the same time, one which is efficient and effective in its use.

Various other objects and advantages of this invention will be more apparent in the course of the following specification and will be particularly pointed out in the appended claims.

In the accompanying drawing there is shown, for the purpose of illustration, an embodiment which my invention may assume in practice.

Figure 2:
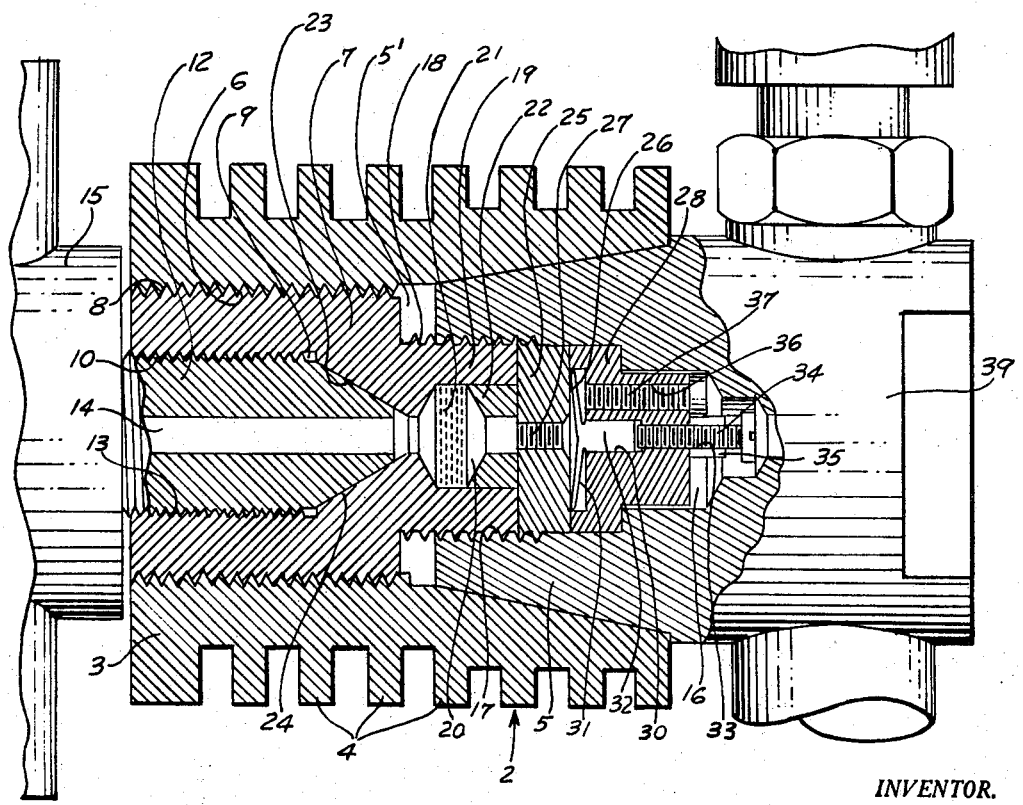

In the drawing:

FIG. 1 is a front elevational view of the improved pressure indicator in accordance with the present invention, and FIG. 2 is a longitudinal sectional view thereof.

Referring more particularly to the drawings, the improved pressure indicator of my invention comprises a cylindrical part 3 preferably having fins 4 arranged around the periphery thereof and an upper cylindrical part 5 with both parts being telescopically arranged relative to one another.

The lower part 3 has an axially arranged central bore 5' which is internally threaded, as at 6. There is provided a first body member 7 which is externally threaded, as at 8, and which is screwed into the threaded portion 6 of the bore 5 of this lower part 3. This body member 7 also has an axially arranged central bore 9 which is internally threaded, as at 10. There is provided another or second body member 12 which is externally threaded, as at 13, and which is screwed into the bore 9 of the body member 7. This second body member also has an axially central bore 14 extending throughout the length thereof. On the outer end of this body member 12, there is arranged a wing nut 15 for connecting the indicator to the cylinder to be tested in a conventional and well known manner.

In the upper or second part 5, there is provided an axially central bore 16 having an internally threaded portion 17 which cooperates with an externally threaded portion 18 disposed on a reduced inner end portion 19 of the body member 7. In the bore 20 of this reduced inner end portion 19, there is arranged preferably a filter, such as a screen 21, which is held in place therein preferably by a washer-like plug 22. The inner end of the body member 12 is preferably tapered, as at 23, which tapered portion abuts and cooperates with the inner tapered wall portion 24 in the bore 5 of the body member 7.

In the bore 16 of the second part 5, there is arranged a lower valve seat member 25 having a seat 26 and a central threaded bore 27 which member is positioned directly next to the inner end of the reduced inner end portion 19 of the body member 7. Above the lower valve seat member 25, there is arranged in the bore 16 an upper valve holding member 28 also having a central bore 30. There is provided a valve 31 having a valve stem 32 which valve is obviously positioned between the upper and lower valve members 25 and 28 with the valve stem 32 adjustably disposed in the bore 30 of the upper valve holding member.

The upper portion of the bore 30 in the upper valve holding member 28 is internally threaded, as at 33, and there is positioned therein a cap screw 34 having a lock nut 35 arranged thereon. In this upper valve holding member 28 there is arranged a hole or passageway 36 which is preferably internally threaded as at 37 for the purpose of assembling the indicator. A suitable indicating gauge 38 is arranged on the upper end of the second part or upper part 5 in a conventional manner.

In operation, the improved pressure indicator in accordance with the present invention functions in the following manner and substantially in the same manner as described in my Patent No. 2,280,411, issued Apr. 21, 1942.

The indicator is first suitably connected to the cylinder in which it is desired to determine the pressure. The gases in the cylinder pass up through the bore 14 through the screen 21 and through the bore 27 in the lower valve seat member 25 forcing the valve 31 off its seat. The gases then pass around the valve and up through the passageway 36 into the upper portion of the bore 16 and through the connecting portion 39 to the gauge 38.

While there is shown and described an embodiment which the invention may assume in practice, it will be understood that this embodiment is merely for the purpose of illustration and description, and that other forms can

I claim:

1. A pressure indicator for determining the maximum pressure in the cylinder of an internal combustion engine and the like comprising a housing consisting of at least two parts with a first part telescopically arranged relative to a second part, said first part having a central bore which is internally threaded, an externally threaded first body member screwed into said bore also having a central bore therein which is internally threaded, said member having an inner end portion which is also externally threaded, means arranged on the outer end of said last mentioned member for connecting the same to the cylinder to be tested, the inner end of said second part being telescopically arranged in the bore in the inner end of said first part, said second part having a central bore which is internally threaded at the inner end thereof and which is screwed onto the externally threaded portion of the inner end portion of the first body member, a lower valve seat member arranged in the bore of said second part abutting the inner end of the inner end of said first body member, and having an internally threaded central bore, an upper valve holding member arranged in the bore of said second part opposite said lower valve seat member also having a central bore therein, said upper valve holding member having a passageway arranged therein disposed substantially parallel to the bore therein and to one side thereof communicating with the bore in said upper valve and the space between said upper and lower valve members, a valve positioned between said upper and lower valve members having a valve stem disposed in the bore of said upper valve holding member, a screw positioned in the upper internally threaded portion of the bore of said upper valve holding member having a lock nut arranged thereon, and means for connecting a gauge to said second part of said housing.

2. A pressure indicator as defined in claim 1, including a filter member arranged in inner end of the bore of the inner end portion of said first body member below the lower valve seat member.

3. A pressure indicator as defined in claim 1, wherein the inner end of the second body member is tapered and cooperates with an inner tapered wall portion in the bore of said first body member.

4. A pressure indicator for determining the maximum pressure in the cylinder of an internal combustion engine and the like comprising a housing consisting of at least two parts with a first part telescopically arranged relative to a second part, said first part having a central bore which is internally threaded, an externally threaded first body member screwed into said bore also having a central bore therein which is internally threaded, said member having a reduced inner end portion which is also externally threaded, a second body member which is externally threaded screwed into said second mentioned bore, said second body member also having a centrally arranged bore extending axially therethrough, means arranged on the outer end of said last mentioned member for connecting the same to the cylinder to be tested, the inner end of said second part being telescopically arranged in the bore in the inner end of said first part, said second part having a central bore which is internally threaded at the inner end thereof and which is screwed onto the externally threaded portion of the reduced inner end portion of the first body member, a lower valve seat member arranged in the bore of said second part abutting the inner end of the reduced inner end of said first body member and having an axially arranged bore therein, an upper valve holding member arranged in the bore of said second part opposite said lower valve seat member also having a central bore therein, said upper valve holding member having a passageway arranged therein disposed substantially parallel to the bore therein and to one side thereof communicating with the bore in said upper valve holding member and the space between said upper and lower valve members, a valve positioned between said upper and lower valve members having a valve stem disposed in the bore of said upper valve holding member, a screw positioned in an upper internally threaded portion of the bore of said upper valve holding member having a lock nut arranged thereon, and means for connecting a gauge to said second part of said housing.

5. A pressure indicator as defined in claim 4, including a filter member arranged in inner end of the bore of the reduced end portion of said first body member below the lower valve seat member.

6. A pressure indicator as defined in claim 4, wherein the inner end of the second body member is tapered and cooperates with an inner tapered well portion in the bore of said first body member.

References Cited

UNITED STATES PATENTS

| | | | |
|---|---|---|---|
| 1,960,158 | 5/1934 | Lehmann | 73—392 X |
| 2,280,411 | 4/1942 | Kiene | 73—116 |
| 2,486,133 | 10/1949 | Egger | 73—395 |
| 3,311,131 | 3/1967 | Zahuranec | 73—392 X |

RICHARD C. QUEISSER, *Primary Examiner.*

JAMES J. GILL, *Examiner.*

J. W. MYRACLE, *Assistant Examiner.*